UNITED STATES PATENT OFFICE.

JAMES LEWIS KRAFT, OF CHICAGO, ILLINOIS.

PROCESS OF STERILIZING CHEESE AND AN IMPROVED PRODUCT PRODUCED BY SUCH PROCESS.

1,186,524. Specification of Letters Patent. Patented June 6, 1916.

No Drawing. Application filed March 25, 1916. Serial No. 86,764. REISSUED

*To all whom it may concern:*

Be it known that I, JAMES LEWIS KRAFT, a citizen of the United States, residing at Chicago, in the county of Cook and State of Illinois, have invented a certain new and Improved Process of Sterilizing Cheese and an Improved Product Produced by Such Process, of which the following is a specification.

This invention relates to an improved process of sterilizing cheese to render it permanently keeping, and to the product thereby produced.

The chief object of the invention is to convert cheese of the Cheddar genus into such condition that it may be kept indefinitely without spoiling, under conditions which would ordinarily cause it to spoil, and to accomplish this result without substantially impairing the taste of the cheese. Incidentally, the process has a marked value in that it has the effect of permanently arresting the curing or flavor-development of the cheese, from which it follows that the cheese may be brought to the precise stage of ripening desired and then permanently arrested and kept in that stage or condition until consumed.

The invention consists in the matter hereinafter described and more particularly pointed out in the appended claims.

It is common knowledge that various food products may be sterilized by the application of heat and then hermetically sealed under sterilized conditions and so rendered permanently keeping. But the attempt to apply such treatment to cheese of the Cheddar genus has invariably resulted in failure, so far as rendering the product permanently keeping is concerned.

It is a well known fact that cheese of the Cheddar genus cannot be heated to a temperature much above its melting point without disintegrating and permanently losing its true cheesy character. That is to say, the melted cheese becomes stringy and the casein and fats separate and cannot be returned to their original combined true cheese form and homogeneous condition. For this reason it has been impossible to treat such cheese to a high sterilizing temperature without spoiling it, and a completely sterilized and permanently keeping cheese of the Cheddar genus has not been produced prior to my discovery.

I understand that various cheeses, especially of the soft varieties, such as Camembert, Limburger, Brie, etc., which in the advance stages of curing become liquid or semi-liquid, have been made permanently keeping by sterilizing with heat and sealing hermetically under sterilized conditions. I believe the explanation to be that in the process of making and curing soft cheeses of the varieties stated, all those bacteria which can only be killed by heat of a comparatively high degree, have been killed off, (possibly by a toxic condition of the cheese as regards such bacteria, developed by the curing) while the remaining bacteria are all such as may be killed at a relatively low temperature,—a temperature below at which the cheese will distintegrate and be spoiled. Hence, sterilization of these cheeses has been possible. On the other hand, in case of cheese of the Cheddar genus, the making and curing or ripening does not eliminate bacteria present and which require a relatively high temperature to kill them, and it follows that the high temperature for sterilizing is imperative, and coupled with such high temperature treatment, some treatment which will prevent the high temperature from spoiling or disintegrating the cheese.

I have discovered that cheese of the Cheddar genus may be prevented from disintegrating under the action of heat of as high temperature as 175° F. or even more, by subjecting the mass to proper agitation and stirring continuously or substantially continuously throughout the period beginning with the application of heat to the cheese, and continued until it has reached the necessary temperature and been maintained at that temperature amply long enough to insure thorough sterilization. A temperature of 175° F. maintained for a period of ten or fifteen minutes is ample to insure thorough sterilization.

In carrying out my improved process, a preferred way is substantially as follows: The cheese having been made and cured to the desired stage in the usual or any suitable way, the bandages are removed and the cheese cut up into small pieces, preferably by the use of a suitable slicing machine; the cutting up being desirable to facilitate the stirring in the early stages and to allow the heat to penetrate quickly and with approximate uniformity. The cut up cheese is placed in a steam jacketed or hot water jacketed kettle, or other suitable heating device wherein it may be subjected to the desired temperature without scorching. The kettle or other receptacle in which the cheese is treated is desirably equipped with mechanical stirrers, though stirring might be performed manually. The steam, hot water, or other source of heat, is then applied gradually to the vessel and the temperature raised until the contents of the kettle reaches approximately 175° F. at approximately which temperature it is held for a period sufficient to completely destroy the life of all bacteria, usually for approximately fifteen minutes. While the cheese is being melted and while it is held at sterilizing temperature, it is actively stirred or agitated by suitable stirrers, and this treatment results in maintaining the mixture homogeneous and from losing its true cheese character. After complete sterilization is assured, the liquid cheese is run off into suitable containers and, ordinarily, hermetically sealed under sterile conditions. After it has cooled it possesses its original flavor unimpaired, or substantially unimpaired, and its texture is homogeneous and substantially the same as it was before the treatment, excepting of course, the elimination of such cellular cavities as may have existed in the cheese. The hermetically sealing under sterilized conditions is preferably and readily accomplished by drawing off the cheese into thoroughly clean cans or jars and sealing these while the cheese still remains at a sterilizing temperature. The subsequent cooling of the contents of the containers produces a partial vacuum and causes atmospheric pressure to supplement the mechanical pressure through which the seal is effected; such vacuum sealing being well understood in the art of canning and packaging fluids.

In the use of the term "Cheddar genus" I refer to all the cheeses, however named, made by a Cheddar process. The group of so-called American cheeses are typical examples of the Cheddar genus.

I claim as my invention:

1. The improved process of rendering cheese of the Cheddar group permanently keeping, which consists in heating and melting the cheese, actively stirring it while melted, and while thus maintained in homogeneous condition raising its temperature to such degree as to effect complete sterilization and then inclosing it in protective containers under sterilized condition.

2. The improved process of rendering cheese of the Cheddar genus permanently keeping, which consists in heating it to approximately 175° F., retaining it at such raised temperature for a substantial period, agitating or stirring the cheese during the treatment with heat, and finally placing it while sterile in suitable sterilized hermetically sealed containers.

3. As a new article of manufacture, completely sterilized cheese of the Cheddar genus.

4. As a new article of manufacture, a hermetically sealed completely sterilized package of cheese of the Cheddar genus.

5. As a new article of manufacture, a hermetically sealed completely sterilized package of non-liquid homogeneous cheese of the Cheddar genus.

JAMES LEWIS KRAFT.